(12) United States Patent
Li et al.

(10) Patent No.: US 8,520,789 B2
(45) Date of Patent: *Aug. 27, 2013

(54) METHOD AND APPARATUS FOR IMPLEMENTING PULSE SYNCHRONIZATION

(75) Inventors: Yang Li, Shenzhen (CN); Matthew Leung, Hong Kong (CN); Tin Yau Fung, Hong Kong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/475,298

(22) Filed: May 18, 2012

(65) Prior Publication Data

US 2012/0294402 A1    Nov. 22, 2012

Related U.S. Application Data

(63) Continuation of application No. PCT/CN2011/074432, filed on May 20, 2011.

(51) Int. Cl.
*H04L 7/00*    (2006.01)

(52) U.S. Cl.
USPC ........... 375/354; 375/356; 375/368; 375/371; 327/141; 327/144; 327/160; 327/162; 327/291; 327/295; 327/296; 370/350; 370/503; 370/509; 370/513; 370/514; 370/520

(58) Field of Classification Search
USPC ............... 375/354, 368, 371, 356; 370/350, 370/503, 509, 513, 514, 520; 327/141, 144, 327/160, 162, 291, 295, 296
See application file for complete search history.

(56) References Cited

U.S. PATENT DOCUMENTS

| | | | |
|---|---|---|---|
| 5,388,102 A * | 2/1995 | Griffith et al. | 370/512 |
| 5,416,808 A | 5/1995 | Witsaman et al. | |
| 6,175,603 B1 * | 1/2001 | Chapman et al. | 375/354 |
| 2002/0031093 A1 | 3/2002 | Gfeller et al. | |

FOREIGN PATENT DOCUMENTS

| | | |
|---|---|---|
| CA | 1302594 C | 6/1992 |
| CN | 1082285 A | 2/1994 |
| CN | 1629767 A | 6/2005 |
| CN | 1636358 A | 7/2005 |

OTHER PUBLICATIONS

Search Report issued in corresponding Chinese Patent Application No. 2011800007433, mailed Sep. 13, 2012.
International Search Report issued in corresponding PCT Patent Application No. PCT/CN2011/074432, mailed Mar. 12, 2012.

* cited by examiner

*Primary Examiner* — Daniel Washburn
*Assistant Examiner* — Rahel Guarino
(74) *Attorney, Agent, or Firm* — Brinks Hofer Gilson & Lione

(57) ABSTRACT

The present invention relates to the communication field and discloses a method and an apparatus for implementing pulse synchronization, so that the control on a single-chip multi-channel device can be simplified. A method for implementing pulse synchronization includes: when a cycle count value corresponding to a reference symbol port of the multiple ports reaches a length of a predetermined pulse cycle, obtaining, by a microprocessor, cycle count values corresponding to the multiple ports; obtaining lengths of temporary synchronization cycles of the multiple ports according to the length of the predetermined pulse cycle and the cycle count values corresponding to the multiple ports; and sending the lengths of the temporary synchronization cycles to logic circuits corresponding to the multiple ports. Embodiments of the present invention are mainly applied in communication systems to output pulse symbols synchronously.

12 Claims, 7 Drawing Sheets

METHOD AND APPARATUS FOR IMPLEMENTING PULSE SYNCHRONIZATION

CROSS-REFERENCE TO RELATED APPLICATIONS

This application is a continuation of International Application No. PCT/CN2011/074432, filed on May 20, 2011, which is hereby incorporated by reference in its entirety.

FIELD OF THE INVENTION

The present invention relates to the communications field, and in particular, to a method and an apparatus for implementing pulse synchronization.

BACKGROUND OF THE INVENTION

Currently, an orthogonal frequency division multiplexing (OFDM, Orthogonal Frequency Division Multiplexing) technology has been widely applied in the communications field. A physical device needs to generate pulse symbols by using a certain interval as a cycle, and define a data signal by two neighboring pulse symbols. Then, a transformation between a time domain and a frequency domain is performed for each segment of data signals. To meet the requirements of large-scale communication systems, the prior art generally implements the OFDM technology by using a single-chip multi-channel device. In a single-chip multi-channel device, each channel outputs an independent pulse symbol, and defines a kind of data signal. Each data signal is defined by their respective pulse symbols to perform a transformation between the time domain and the frequency domain.

In the process of implementing the above solution, the inventor discovers that the prior art has at least the following problems: In a single-chip multi-channel device, each channel generates an independent pulse symbol, but the microprocessor of the device needs to control the pulse symbols of each channel separately; in addition, different channels use different resources and configuration information, so additional configuration and management are required. Therefore, the control on the entire device becomes more complex.

SUMMARY OF THE INVENTION

Embodiments of the present invention provide a method and an apparatus for implementing pulse synchronization to simplify the control on a single-chip multi-channel device.

To achieve the foregoing objective, embodiments of the present invention adopt the following technical solutions:

A method for implementing pulse synchronization includes:

when a cycle count value corresponding to a reference symbol port of multiple ports reaches a length of a predetermined pulse cycle, obtaining, by a microprocessor, cycle count values corresponding to the multiple ports;

obtaining lengths of temporary synchronization cycles of the multiple ports according to the length of the predetermined pulse cycle and the cycle count values corresponding to the multiple ports; and sending the lengths of the temporary synchronization cycles to logic circuits corresponding to the multiple ports, so that the logic circuits corresponding to the multiple ports enter the temporary synchronization cycles after the current predetermined pulse cycle expires, so that the logic circuits corresponding to the multiple ports and the reference symbol port of the multiple ports output a pulse symbol synchronously.

An apparatus for implementing pulse synchronization includes:

a cycle count value obtaining unit, configured to obtain cycle count values corresponding to the multiple ports when a cycle count value corresponding to a reference symbol port of the multiple ports reaches a length of a predetermined pulse cycle;

a temporary synchronization cycle generating unit, configured to obtain lengths of temporary synchronization cycles of the multiple ports according to the length of the predetermined pulse cycle and the cycle count values corresponding to the multiple ports; and a temporary synchronization cycle sending unit, configured to send the lengths of the temporary synchronization cycles to logic circuits corresponding to the multiple ports, so that the logic circuits corresponding to the multiple ports enter the temporary synchronization cycles after the current predetermined pulse cycle expires, so that the logic circuits corresponding to the multiple ports and the reference symbol port of the multiple ports output a pulse symbol synchronously.

By using the method and apparatus for implementing pulse synchronization according to embodiments of the present invention, the cycle of outputting a pulse symbol by each channel in a single-chip multi-channel device is adjusted, so that each channel can output a pulse symbol synchronously. In this way, the microprocessor uniformly controls the pulse symbols of each channel, and resources and configuration information required by the pulse symbols of each channel can also be uniformly managed, which simplifies the control on the single-chip multi-channel device.

DETAILED DESCRIPTION OF THE EMBODIMENTS

The technical solutions provided in embodiments of the present invention are hereinafter described clearly with reference to the accompanying drawings. Apparently, the embodiments described below are only some exemplary embodiments of the present invention, without covering all embodiments of the present invention. All other embodiments that persons skilled in the art obtain based on embodiments of the present invention without creative efforts also fall within the protection scope of the present invention.

Embodiment 1

Figure 1:
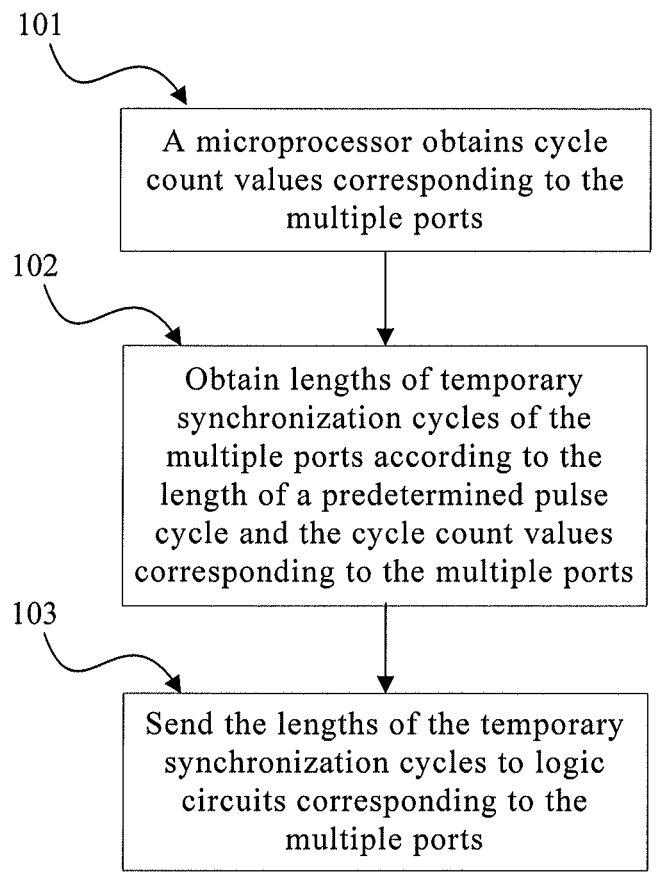
FIG. 1 is a flowchart of a method for implementing pulse synchronization according to a first embodiment of the present invention.

A first embodiment of the present invention provides a method for implementing pulse synchronization. As shown in FIG. 1, the method includes the following steps:

Step 101: A microprocessor obtains cycle count values corresponding to multiple ports.

When a predetermined pulse cycle of a reference symbol port of the multiple ports of a single-chip multi-channel device expires, the cycle count value corresponding to the reference symbol port reaches the length of the predetermined pulse cycle. In this case, the microprocessor obtains current cycle count values corresponding to the multiple ports. The reference symbol port may be selected by the user or operator of the single-chip multi-channel device, and this is not limited in the embodiment of the present invention.

Step 102: Obtain lengths of temporary synchronization cycles of the multiple ports according to the length of the predetermined pulse cycle and the cycle count values corresponding to the multiple ports.

In the single-chip multi-channel device, ports of each channel output an independent pulse symbol respectively by using a predetermined pulse cycle of the same duration, and the time for outputting pulse symbols by ports of different channels may be different. To synchronize pulse symbols between ports of different channels, the length of the temporary synchronization cycle of each port needs to be obtained.

Step 103: Send the lengths of the temporary synchronization cycles to logic circuits corresponding to the multiple ports.

The time for outputting pulse symbols by different ports may not be completely synchronized. The lengths of the temporary synchronization cycles are sent to the multiple ports, so that the multiple ports obtain corresponding temporary synchronization cycles. In this way, the multiple ports can output pulse symbols on a completely synchronized basis after the corresponding temporary synchronization cycles. When the ports of each channel in the single-chip multi-channel device output pulse symbols synchronously, the microprocessor may uniformly control the pulse symbols synchronously output by the multiple ports and uniformly manage resources and configuration information.

Figure 2:
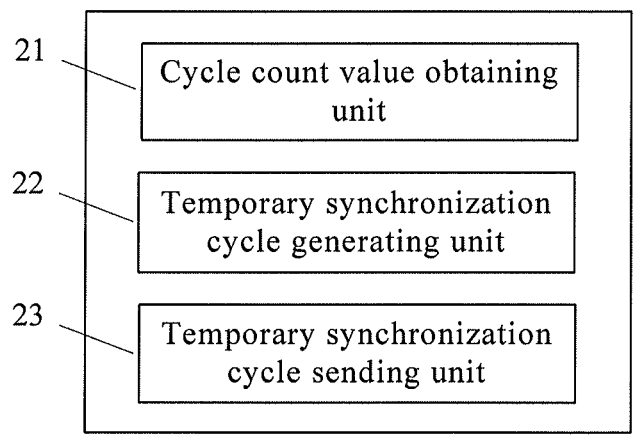
FIG. 2 is a block diagram of an apparatus for implementing pulse synchronization according to a first embodiment of the present invention.

The first embodiment of the present invention also provides an apparatus for implementing pulse synchronization. As shown in FIG. 2, the apparatus includes a cycle count value obtaining unit 21, a temporary synchronization cycle generating unit 22, and a temporary synchronization cycle sending unit 23.

The cycle count value obtaining unit 21 is configured to obtain cycle count values corresponding to the multiple ports when a cycle count value corresponding to a reference symbol port of the multiple ports reaches the length of a predetermined pulse cycle.

The temporary synchronization cycle generating unit 22 is configured to obtain the lengths of temporary synchronization cycles of the multiple ports according to the length of the predetermined pulse cycle and the cycle count values corresponding to the multiple ports.

The temporary synchronization cycle sending unit 23 is configured to send the lengths of the temporary synchronization cycles to logic circuits corresponding to the multiple ports, so that the logic circuits corresponding to the multiple ports enter the temporary synchronization cycles after the current predetermined pulse cycle expires, which enables the logic circuits corresponding to the multiple ports to be synchronized with the reference symbol port of the multiple ports.

By using the method and apparatus for implementing pulse synchronization according to the first embodiment of the present invention, the cycle of outputting a pulse symbol by each channel in the single-chip multi-channel device is adjusted, so that each channel can output a pulse symbol synchronously. In this way, the microprocessor uniformly controls a pulse symbol of each channel, and resources and configuration information required by the pulse symbols of each channel can also be uniformly managed, which simplifies the control on the single-chip multi-channel device.

Embodiment 2

Figure 3:
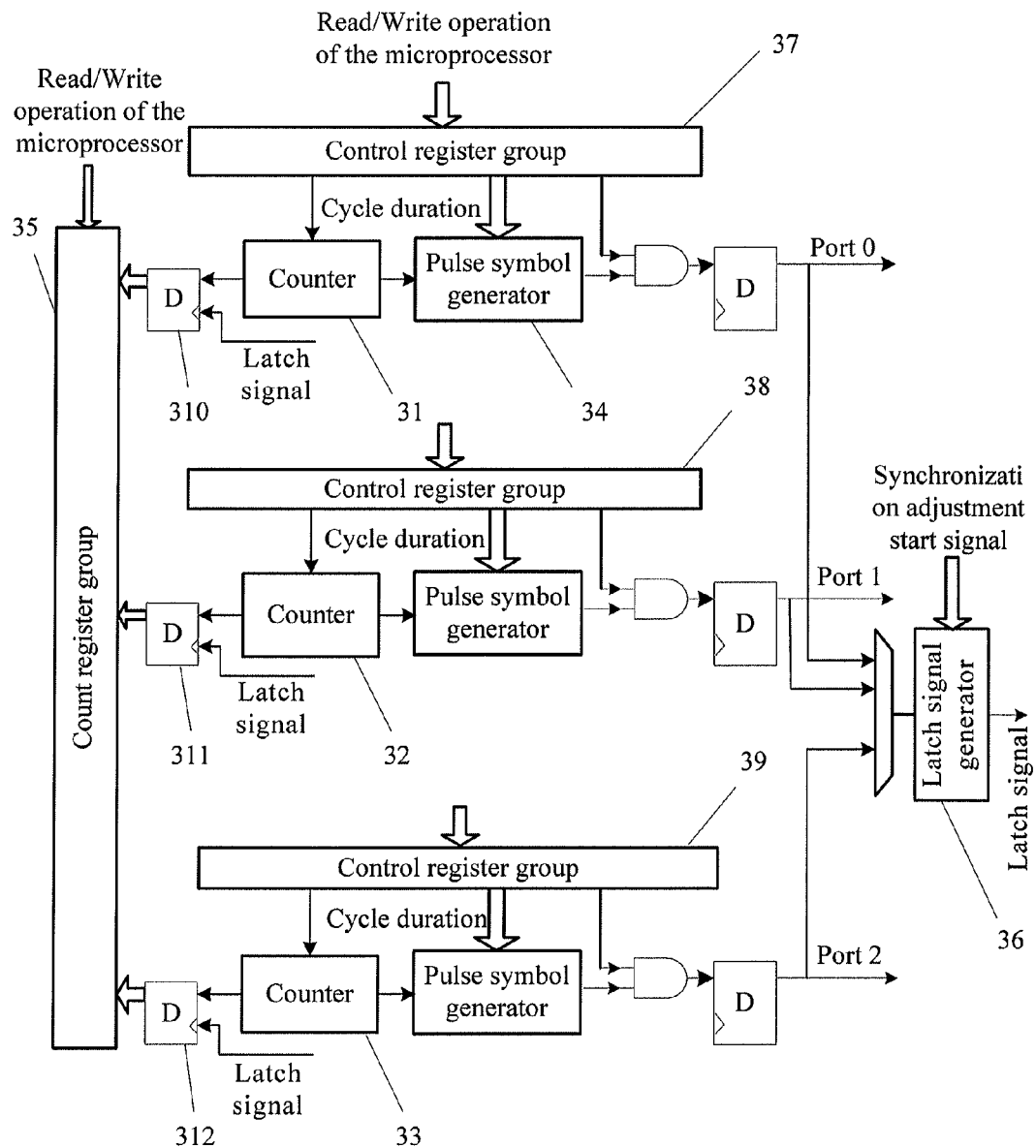
FIG. 3 is a schematic diagram of a device configuration solution according to a second embodiment of the present invention.

To synchronize pulse symbols output by different ports in a single-chip multi-channel device, a hardware component can be laid out at the periphery of the chip, and meanwhile a corresponding software program is used. FIG. 3 illustrates a solution for laying out a hardware component at the periphery of the chip. The layout solution shown in FIG. 3 is a common scenario in a practical application, in which a microprocessor chip and the hardware component laid out at the periphery of the chip can be integrated and packaged as a system on chip (SOC, System on Chip). For the convenience of description, the component shown in FIG. 3 has three ports that can output pulse symbols, and the number of ports is not limited in a practical application. Taking port 0 as an example, the counter 31 of port 0 is configured to count the cycle of generating a pulse symbol and transmit a count result to a pulse symbol generator 34; when the count result reaches a condition for generating a pulse symbol, the pulse symbol generator 34 generates a pulse symbol and outputs the pulse symbol through port 0. A control register group 37 of port 0 is read and written by the microprocessor to control the pulse symbol output of port 0. The control register group 38 of port 1 and control register group 39 of port 2 are also read and written by the microprocessor. The control register groups may send cycle duration signals (including the duration of a predetermined pulse cycle and the duration of a temporary synchronization cycle) to corresponding pulse symbol generators, so that the pulse symbol generators generate pulse symbols when the received cycle count values of the counters reach the cycle duration signals. The control register group may also perform enabling control over the counter in a logic circuit and over port outputting. In addition, the microprocessor performs read and write operations on a count register group 35.

Figure 4:
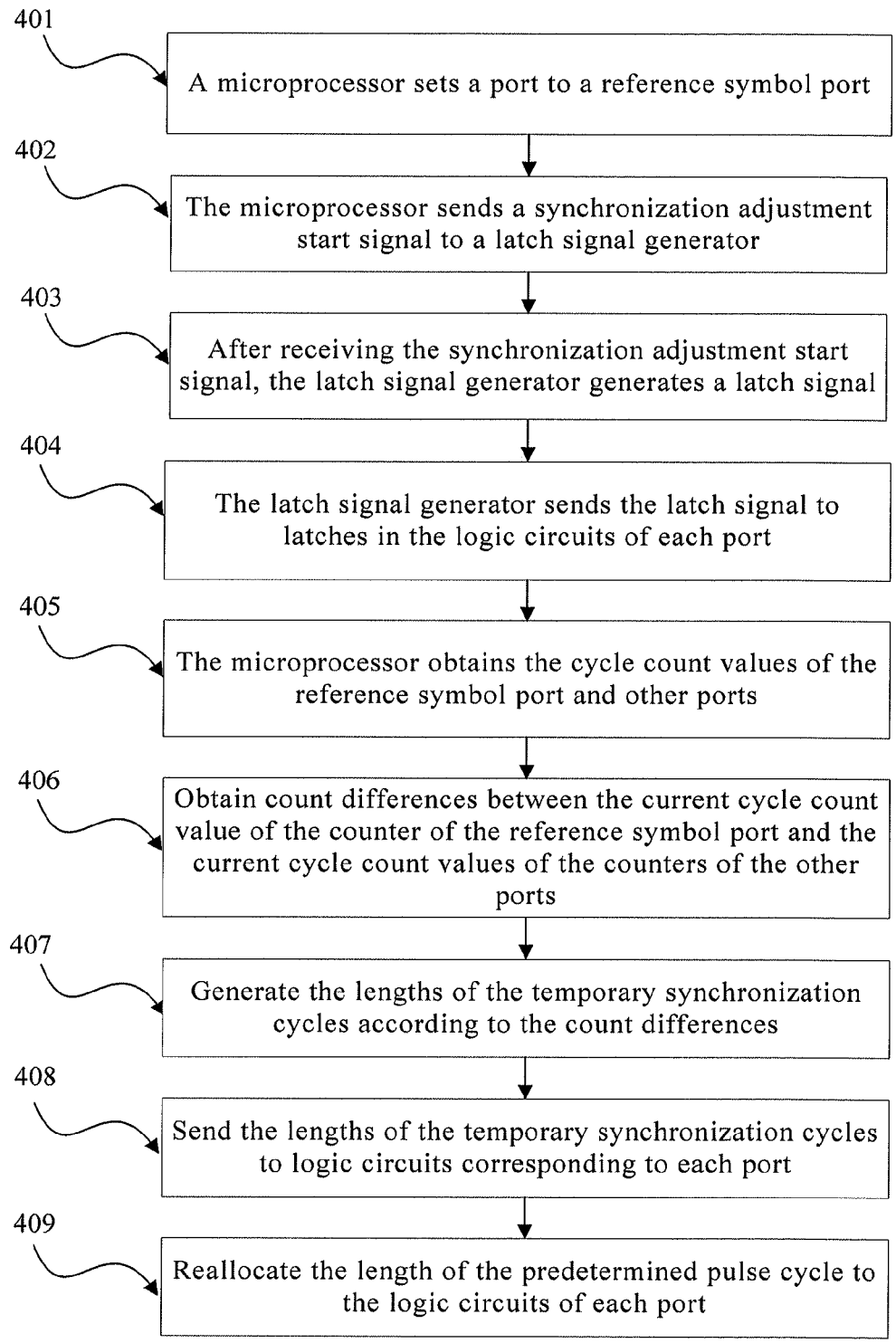
FIG. 4 is a flowchart of a method for implementing pulse synchronization according to a second embodiment of the present invention.

In this application scenario, this embodiment also provides a method for implementing pulse synchronization. As shown in FIG. 4, the method includes the following steps:

Step 401: A microprocessor sets a port to a reference symbol port.

Taking FIG. 3 as an example, if port 0 is set to the reference symbol port, temporary synchronization cycles corresponding to port 1 and port 2 may be generated after a difference between the current cycle count values of the counter 32 and the counter 33 and the cycle count value of the counter 31 of the reference symbol port is obtained. Certainly, port 1 or port 2 may also be selected as the reference symbol port. In a practical application, the reference symbol port may be selected by the user or operator of the single-chip multi-channel device, and this is not limited in the embodiment of the present invention.

Step 402: The microprocessor sends a synchronization adjustment start signal to a latch signal generator.

The condition for sending the synchronization adjustment start signal may be pre-configured in software codes; when the microprocessor runs the software codes and triggers the sending condition, the synchronization adjustment start signal is sent to the latch signal generator.

Step 403: After receiving the synchronization adjustment start signal, the latch signal generator generates a latch signal.

The latch signal generator may be constituted by hardware components. The latch signal is generated and output according to the synchronization adjustment start signal sent from the microprocessor.

Before receiving the synchronization adjustment start signal, the latch signal generator also needs to obtain pulse symbols output by each port. For example, in FIG. 3, the pulse symbols output by port 0, port 1, and port 2 need to be sent to the latch signal generator 36.

Step 404: The latch signal generator sends the latch signal to latches in the logic circuits of each port.

After the counters of each port receive the latch signal, the counters send their respective current cycle count values to their respective count register groups through the latches of the corresponding ports.

In an optional solution for generating the latch signal and latching the cycle count values of each port, a single bit latch control register may be set in the latch signal generator, where the single bit of the latch control register is in a low level state by default. The synchronization adjustment start signal may be a write operation that the microprocessor performs on the latch control register. After the write operation is performed, the single bit of the latch control register changes to a high level state, and maintains the high level state until the reference symbol port outputs a pulse symbol. After a pulse symbol output by the reference symbol port is detected, the single bit of the latch control register changes back to the low level state, generates and outputs a latch signal by using the fact that the single bit changes from the high level state to the low level state as a trigger condition. As shown in FIG. 3, the latch signal is input to latches (that is, a D trigger 310, a D trigger 311, and a D trigger 312, which are latches in the logic circuits of corresponding ports) in the logic circuits of each port. When the latches do not receive the latch signal, the latches do not receive and store the current cycle count values of the counters; when the latches receive the latch signal, the current cycle count value of each counter is latched by the latches and transmitted to the count register group 35.

Figure 5:
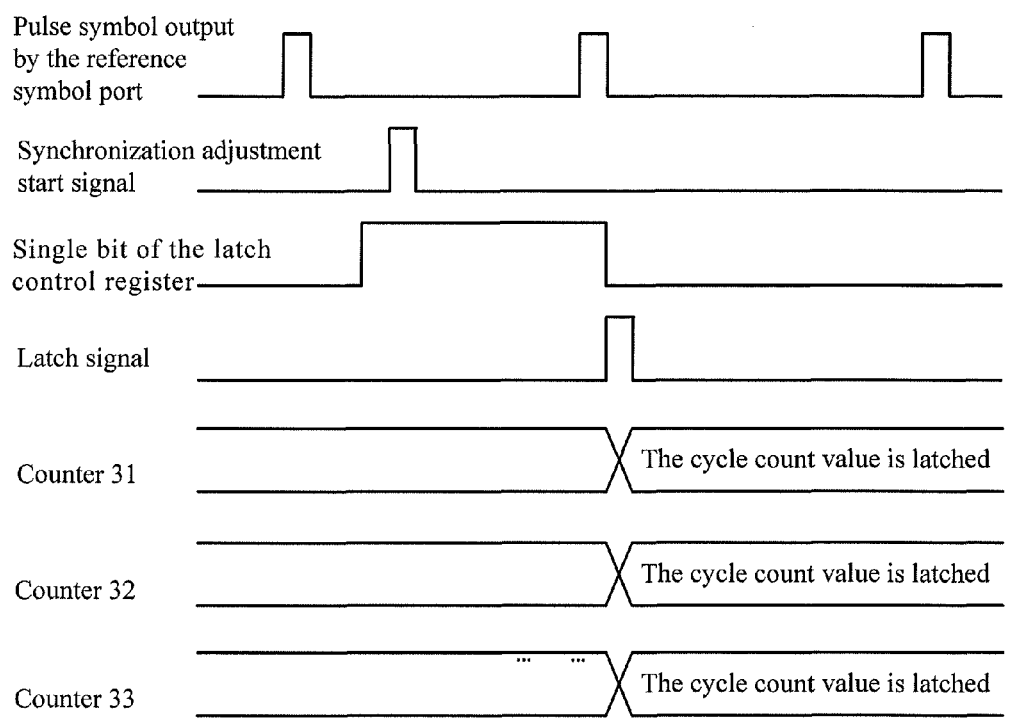
FIG. 5 is a sequence chart illustrating a process of latching a cycle count value by using a synchronization adjustment start signal according to a second embodiment of the present invention.

The process of changing the single bit of the latch control register and latching the current cycle count values of each port may be as shown in FIG. 5. Taking the three ports in FIG. 3 as an example, port 0 is set to the reference symbol port. After the high level of the latch signal occurs, the cycle count values of the counters 31, 32, and 33 are latched.

Step 405: The microprocessor obtains the cycle count values of the reference symbol port and the other ports.

In FIG. 3, the counters 31, 32, and 33 each perform cycle counting. After the latched cycle count values in step 404 are transmitted to the count register group 35, the microprocessor reads the latched cycle count values of the three ports from the count register group 35.

Step 406: Obtain count differences between the current cycle count value of the counter of the reference symbol port and the current cycle count values of the counters of the other ports.

Step 407: Generate the lengths of the temporary synchronization cycles according to the count differences.

Step 406 and step 407 are described by taking the three ports shown in FIG. 3 as examples. The microprocessor reads, from the count register group 35, the current cycle count value VALUE0 of the counter 31 of port 0, the current cycle count value VALUE1 of the counter 32 of port 1, and the current cycle count value VALUE2 of the counter 33 of port 2. When port 0 is the reference symbol port, the microprocessor calculates the differences between the VALUE0 and the VALUE1 and between the VALUE0 and the VALUE2. After finishing the calculation, the microprocessor obtains the lengths of the temporary synchronization cycles according to each difference, and further obtains the temporary synchronization cycles. The method for obtaining the lengths of the temporary synchronization cycles may be the following two methods:

4071: When a count difference is smaller than one half of the length of the predetermined pulse cycle, set a difference between the length of the predetermined pulse cycle and the count difference to a length of the temporary synchronization cycle.

4072: When a count difference is greater than or equal to one half of the length of the predetermined pulse cycle, set a difference between the sum of the lengths of two predetermined pulse cycles and the count difference to the length of the temporary synchronization cycle.

The following describes step 4071 and step 4072 by using some examples. It is assumed that the duration of the predetermined pulse cycle Tcycle in the single-chip multi-channel device shown in FIG. 3 is 1,000 clock cycles and that port 0 is the reference symbol port. An optional counting solution is as follows: A pulse symbol is output after the counter counts a predetermined pulse cycle; and the counter clears the count and continues a next count.

When the counter 31 of port 0 counts 1,000 clock cycles (that is, VALUE0=1000), the latch signal generator 36 generates the latch signal and transmits the latch signal to the D trigger 310, D trigger 311, and D trigger 312. In this case, the cycle count value of each counter is latched and input to the count register group 35.

Assuming the latched VALUE1 is equal to 800, because the value of (VALUE0−VALUE1) is 200 and smaller than one half of the predetermined pulse cycle, the temporary synchronization cycle Tcycle_temp1 of port 1 is calculated according to step 4071 as follows:

$$T\text{cycle\_temp1} = T\text{cycle} - (\text{VALUE0} - \text{VALUE1})$$

$$T\text{cycle\_temp1} = 1000 - (1000 - 800) = 800$$

Assuming the latched VALUE2 is equal to 400, because the value of (VALUE0−VALUE2) is 600 and greater than or equal to one half of the predetermined pulse cycle, the temporary synchronization cycle Tcycle_temp2 of port 2 is calculated according to step 4072 as follows:

$$Tcycle\_temp2 = 2*Tcycle - (VALUE0 - VALUE2)$$

$$Tcycle\_temp2 = 2*1000 - (1000 - 400) = 1400$$

It should be noted that the calculation result of the temporary synchronization cycle of port 0 that is used as the reference symbol port is still the Tcycle. In addition, when the calculated value of the temporary synchronization cycle is greater than 2*Tcycle, an optional implementation is to simplify the temporary synchronization cycle (for example, the calculated Tcycle_temp1 or the Tcycle_temp2 minus the integral number of Tcycles, so that the value of the Tcycle_temp1 or the Tcycle_temp2 does not exceed the value of 2*Tcycle). Certainly, a temporary synchronization cycle greater than 2*Tcycle may also be used, and this is not limited in the embodiment of the present invention.

The Tcycle_temp1 is used as the temporary synchronization cycle of port 1 sending the pulse symbol, and the Tcycle_temp2 is used as the temporary synchronization cycle of port 2 sending the pulse symbol. After the microprocessor calculates the above temporary synchronization cycles, the process goes to step 408.

Step 408: Send the lengths of the temporary synchronization cycles to logic circuits corresponding to the multiple ports.

Figure 6:
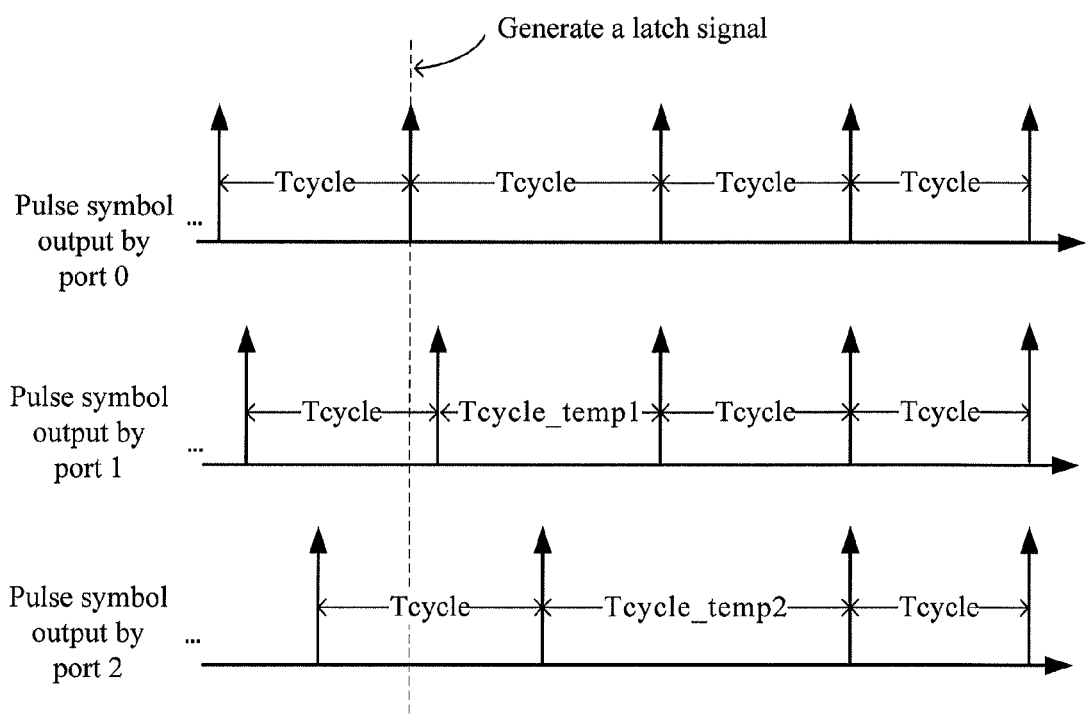
FIG. 6 is a schematic diagram illustrating a process of outputting pulse symbols synchronously by port 1, port 2, and port 3 according to a second embodiment of the present invention.

After the lengths of the temporary synchronization cycles are generated, the length of each temporary synchronization cycle is sent to the logic circuit of the corresponding port, so that each port activates the temporary synchronization cycle after the current predetermined pulse cycle expires and outputs a pulse symbol synchronously after the corresponding temporary synchronization cycle expires. For example, if the temporary synchronization cycles corresponding to port 1 and port 2 shown in FIG. 3 are Tcycle_temp1 and Tcycle_temp2, respectively, the microprocessor writes the Tcycle_temp1 to the control register group 38 of port 1 and the Tcycle_temp2 to the control register group 39 of port 2. After port 1 and port 2 output pulse symbols according to their respective temporary synchronization cycles, port 1 and port 2 output pulse symbols synchronously with port 0. The process of outputting pulse symbols synchronously by port 1, port 2, and port 3 may be as shown in FIG. 6. In FIG. 6, after the latch signal is generated, port 1 and port 2 activate their respective temporary synchronization cycles, and output pulse symbols synchronously with port 0.

Step 409: Reallocate the length of the predetermined pulse cycle to the logic circuits of each port.

After each port outputs a pulse symbol according to their respective temporary synchronization cycles and synchronizes with the reference symbol port, the microprocessor reallocates the length of the predetermined pulse cycle to the logic circuits of each port, so that each port outputs the pulse symbol synchronously at the interval of the predetermined pulse cycle.

As shown in FIG. 6, after each port outputs a pulse symbol synchronously when the corresponding temporary synchronization cycle expires, each port recovers to the predetermined pulse cycle and outputs a pulse symbol synchronously at the interval of 1,000 ms. It should be noted that the foregoing calculation formula of the Tcycle_temp2 is different from that of the Tcycle_temp1. When the difference between the VALUE0 and the VALUE2 exceeds one half of the Tcycle (500 ms), the calculation result of the Tcycle_temp1 is smaller than one half of the Tcycle. Within the time segment of the Tcycle_temp1 smaller than one half of the Tcycle, the microprocessor may not have enough processing time to reallocate the Tcycle to the logic circuit of port 2. Therefore, when the count difference is greater than or equal to one half of the predetermined pulse cycle, the calculation result obtained by using the Tcycle_temp2 is more reliable.

Figure 7:
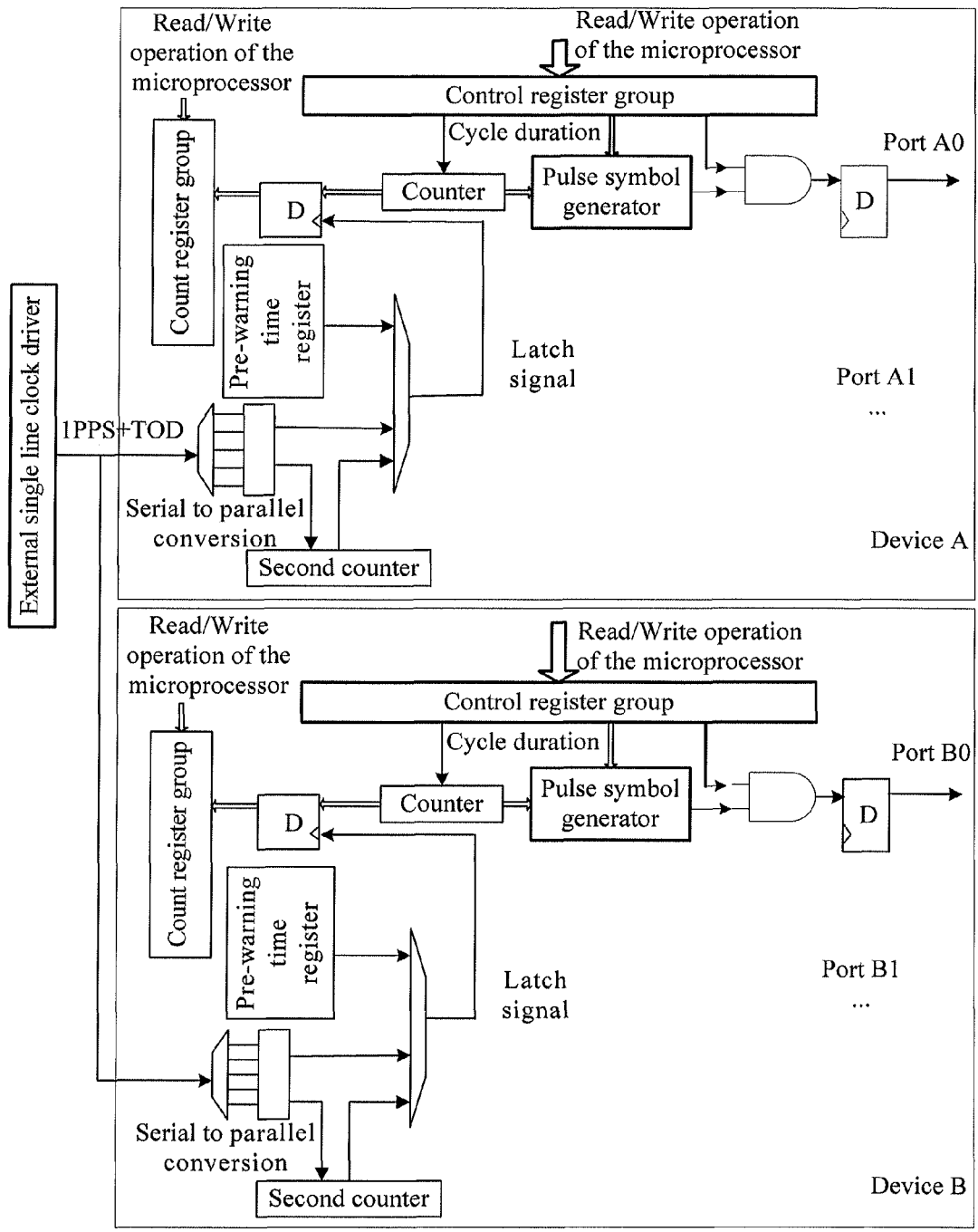
FIG. 7 is a schematic diagram of a configuration solution for implementing pulse synchronization between two single-chip multi-channel devices according to a second embodiment of the present invention.

Further, on the basis of the solution provided in the embodiment of the present invention, more than two single-chip multi-channel devices may be connected, so that all the ports of the multiple single-chip multi-channel devices output pulse symbols synchronously. The following describes a possible implementation. It is assumed that the pulse symbol needs to be synchronized on two single-chip multi-channel devices (device A and device B), as shown in FIG. 7. The ports of device A are port A0 and port A1, and ports of device B are port B0 and port B1. An external single line clock driver may be used to provide clock drive signals for device A and device B. The clock drive signal adopts the combination of 1 pulse per second (1 PPS, 1 pulse per second) and time of date (TOD, time of date). The signal transmission mechanism of the external single line clock driver is as follows: One 1 PPS signal is sent per second, and a piece of serial TOD information is sent in a certain period of time after the 1 PPS signal is sent. The TOD information is binary data of a current time value and is accurate to a second. After device A and device B receive the TOD information, they convert the TOD information into a parallel signal. In addition, a second counter needs to be added to device A and device B. The second counter accumulates clock cycles of the chip (generally, the clock cycle of the microprocessor is accurate to a nanosecond), and clears the count when receiving the 1 PPS signal. In this way, the second counter may perform nanosecond-level counting per second. In addition, the same pre-warning time data is pre-stored in device A and device B, and needs to be as accurate as the clock cycle in order of magnitude. As shown in FIG. 7, the pre-warning time data is stored in a pre-warning time register. The TOD information and the nanosecond-level count value counted by the second counter are combined into time information that is accurate to a nanosecond. When the time information accurate to a nanosecond is equal to the pre-warning time data, device A and device B concurrently send a latch signal to their respective logic circuits used as reference symbol ports. In FIG. 7, port A0 of device A is a reference symbol port, and port B0 of device B is a reference symbol port. Therefore, the reference symbol ports of device A and device B synchronize the pulse symbols. On the basis of that, device A and device B synchronize the pulse symbols respectively by using the solutions in step 402 to step 409 provided in the embodiment of the present invention. In this way, all the ports of device A and device B output pulse symbols synchronously.

By using the method for implementing pulse synchronization according to the second embodiment of the present invention, the cycle of outputting a pulse symbol by each channel in the single-chip multi-channel device is adjusted, so that each channel can output a pulse signal synchronously. In this way, the microprocessor uniformly controls the pulse symbols of each channel, and resources and configuration information required by the pulse symbols of each channel can also be uniformly managed, which simplifies the control on the single-chip multi-channel device. In addition, each port can share such hardware resources as a memory, which reduces the layout areas of circuits. Furthermore, the method provided in the embodiment of the present invention can provide a synchronous pulse symbol for multiple single-chip multi-channel devices, which further simplifies the control on the entire device.

Embodiment 3

Figure 8:
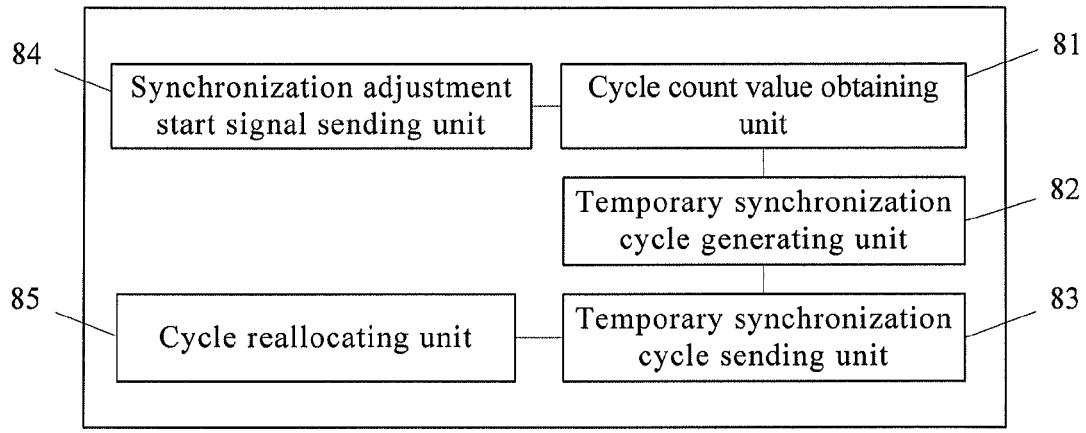
FIG. 8 is a block diagram of an apparatus for implementing pulse synchronization according to a third embodiment of the present invention.

In the solution for laying out hardware components at the periphery of the chip shown in FIG. 3, the microprocessor needs to execute a corresponding software instruction to synchronize the pulse symbols output by each port. Therefore, a third embodiment of the present invention also provides an apparatus for implementing pulse synchronization, where the apparatus is located in the microprocessor. As shown in FIG. 8, the apparatus includes a cycle count value obtaining unit 81, a temporary synchronization cycle generating unit 82, a temporary synchronization cycle sending unit 83, a synchronization adjustment start signal sending unit 84, and a cycle reallocating unit 85.

The synchronization adjustment start signal sending unit 84 is configured to send a synchronization adjustment start signal to a latch signal generator, so that the latch signal generator generates a latch signal after receiving the synchronization adjustment start signal. The cycle count value obtaining unit 81 is configured to obtain the cycle count values corresponding to the multiple ports when the cycle count value corresponding to the reference symbol port of the multiple ports reaches the length of a predetermined pulse cycle. Specifically, for the solution shown in FIG. 3, the cycle count value obtaining unit 81 is configured to obtain the current cycle count values of counters of each port stored in the count register group 35. When a cycle count value is equal to the length of the predetermined pulse cycle, each port outputs a pulse symbol periodically at the interval of the predetermined pulse cycle. In the practical application, the reference symbol port may be selected by the user or operator of the single-chip multi-channel device, and this is not limited in the embodiment of the present invention. The temporary synchronization cycle generating unit 82 is configured to obtain the lengths of temporary synchronization cycles of the multiple ports according to the length of the predetermined pulse cycle and the cycle count values corresponding to the multiple ports. The temporary synchronization cycle sending unit 83 is configured to send the length of each temporary synchronization cycle to the logic circuits of each port, so that each port activates the corresponding temporary synchronization cycle after the current predetermined pulse cycle expires and outputs a pulse symbol synchronously after the corresponding temporary synchronization cycle expires. The cycle reallocating unit 85 is configured to reallocate the length of the predetermined pulse cycle to the logic circuits of the multiple ports after the logic circuits corresponding to the multiple ports and the reference symbol port of the multiple ports output a pulse signal synchronously, so that the multiple ports output the pulse symbol synchronously at the interval of the predetermined pulse cycle.

Figure 9:
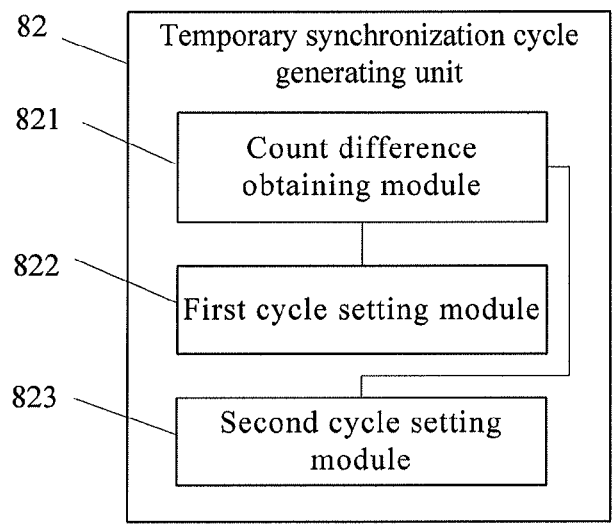
FIG. 9 is a block diagram of an apparatus for implementing pulse synchronization according to a third embodiment of the present invention.

Further, as shown in FIG. 9, the temporary synchronization cycle generating unit 82 of the apparatus includes a count difference obtaining module 821, a first cycle setting module 822, and a second cycle setting module 823. The count difference obtaining module 821 is configured to obtain count differences between the current cycle count value of the counter of the reference symbol port and the current cycle count values of the counters of the multiple ports. The first cycle setting module 822 is configured to set the difference between the length of the predetermined pulse cycle and the count difference to the length of the temporary synchronization cycle when the count difference is smaller than one half of the length of the predetermined pulse cycle. The second cycle setting module 823 is configured to set the difference between the sum of the lengths of two predetermined pulse cycles and the count difference to the length of the temporary synchronization cycle when the count difference is greater than or equal to one half of the length of the predetermined pulse cycle.

The apparatus provided in the third embodiment of the present invention is integrated into a microprocessor of the single-chip multi-channel device, and the microprocessor needs to perform read and write control on other external components and registers so that each port can output pulse symbols synchronously. Descriptions regarding how the microprocessor reads and writes the register and controls the synchronization of pulse symbols are provided in the second embodiment of the present invention, so details are omitted herein.

By using the apparatus for implementing pulse synchronization according to this embodiment of the present invention, the cycle of outputting pulse symbols by each channel in the single-chip multi-channel device is adjusted, so that each channel outputs pulse symbols synchronously and the microprocessor can uniformly control the pulse symbols of each channel. In addition, resources and configuration information required by the pulse symbols of each channel are uniformly managed, which simplifies the control on the single-chip multi-channel device.

Based on the preceding description of the embodiments, it is understandable to those skilled in the art that the present invention may be implemented by software in addition to necessary universal hardware or by hardware only. In most circumstances, the former is preferred. Based on such understanding, the technical solutions of the present invention, or the portions contributing to the prior art may be embodied in the form of a software product. The computer software product is stored in a readable storage medium, such as a computer floppy disk, a hard disk, or a CD-ROM, and includes several instructions to instruct a device (which may be a personal computer, a server, or a network device) to execute the method described in each embodiment of the present invention.

The above descriptions are merely exemplary embodiments of the present invention, but not intended to limit the scope of the present invention. Any modification or replacement made by those skilled in the art without departing from the spirit and principle of the present invention should fall within the protection scope of the present invention. Therefore, the protection scope of the present invention is subject to the appended claims.

What is claimed is:

1. A method for implementing pulse synchronization, used for synchronizing multiple ports of a multi-channel device, the method comprising:
when a cycle count value corresponding to a reference symbol port of the multiple ports reaches a length of a specified pulse cycle, obtaining, by a microprocessor, cycle count values corresponding to the multiple ports;
obtaining lengths of temporary synchronization cycles of the multiple ports according to the length of the specified pulse cycle and the cycle count values corresponding to the multiple ports; and
sending the lengths of the temporary synchronization cycles to logic circuits corresponding to the multiple ports, so that the logic circuits corresponding to the multiple ports enter the temporary synchronization cycles after a current specified pulse cycle expires, so that the logic circuits corresponding to the multiple ports and the reference symbol port of the multiple ports output a pulse symbol synchronously.

2. The method according to claim 1, wherein before the obtaining, by the microprocessor, the cycle count values corresponding to the multiple ports, the method further comprises:
sending, by the microprocessor, a synchronization adjustment start signal to a latch signal generator;
after receiving the synchronization adjustment start signal, generating, by the latch signal generator, a latch signal; and
sending, by the latch signal generator, the latch signal, to latches in the logic circuits of the multiple ports, so that current cycle count values of counters of the multiple ports are sent to a count register group through the latches of the corresponding ports, wherein the counters are configured to count the specified pulse cycle of the pulse symbol;
the obtaining the cycle count values corresponding to the multiple ports by the microprocessor comprises:
obtaining the current cycle count values of the multiple ports stored in the count register group.

3. The method according to claim 2, further comprising:
before receiving the synchronization adjustment start signal, obtaining, by the latch signal generator, pulse symbols output by the multiple ports, wherein the pulse symbols output by the multiple ports comprise a pulse symbol output by the reference symbol port; and
the generating, by the latch signal generator, the latch signal comprises: when detecting that the reference symbol port sends the pulse symbol, generating, by the latch signal generator, the latch signal.

4. The method according to claim 1, wherein the obtaining the lengths of the temporary synchronization cycles of the multiple ports according to the length of the specified pulse cycle and the cycle count values corresponding to the multiple ports comprises:
obtaining a count difference between a current cycle count value of a counter of the reference symbol port and the current cycle count values of the counters of the multiple ports; and
when the count difference is smaller than one half of the length of the specified pulse cycle, setting a difference between the length of the specified pulse cycle and the count difference to the length of the temporary synchronization cycle; or
when the count difference is greater than or equal to one half of the length of the specified pulse cycle, setting a difference between a sum of lengths of two specified pulse cycles and the count difference to the length of the temporary synchronization cycle.

5. The method according to claim 1, wherein after the logic circuits corresponding to the multiple ports and the reference symbol port of the multiple ports output a pulse symbol synchronously, the method further comprises:
reallocating, by the microprocessor, the length of the specified pulse cycle to the logic circuits of the multiple ports, so that the multiple ports output pulse symbols synchronously at an interval of the specified pulse cycle.

6. An apparatus for implementing pulse synchronization, configured to synchronize multiple ports of a multi-channel device, the apparatus comprising:
a cycle count value obtaining unit, configured to obtain cycle count values corresponding to the multiple ports when a cycle count value corresponding to a reference symbol port of the multiple ports reaches a length of a specified pulse cycle;
a temporary synchronization cycle generating unit, configured to obtain lengths of temporary synchronization cycles of the multiple ports according to the length of the specified pulse cycle and the cycle count values corresponding to the multiple ports; and
a temporary synchronization cycle sending unit, configured to send the lengths of the temporary synchronization cycles to logic circuits corresponding to the multiple ports, so that the logic circuits corresponding to the multiple ports enter the temporary synchronization cycles after a current specified pulse cycle expires, so that the logic circuits corresponding to the multiple ports and the reference symbol port of the multiple ports output a pulse symbol synchronously.

7. The apparatus according to claim 6, further comprising:
a synchronization adjustment start signal sending unit, configured to send a synchronization adjustment start signal to a latch signal generator before obtaining the cycle count values corresponding to the multiple ports, so that the latch signal generator generates a latch signal after the latch signal generator receives the synchronization adjustment start signal.

8. The apparatus according to claim 7, wherein the latch signal generator is configured to send the latch signal to latches in the logic circuits of the multiple ports, so that current cycle count values of counters of the multiple ports are sent to a count register group through the latches of the corresponding ports, wherein the counters are configured to count the specified pulse cycle of the pulse symbol.

9. The apparatus according to claim 6, wherein the cycle count value obtaining unit is configured to obtain the current cycle count values of the counters of the multiple ports stored in a count register group.

10. The apparatus according to claim 8, wherein: the latch signal generator is further configured to obtain pulse symbols output by the multiple ports before receiving the synchronization adjustment start signal, wherein the pulse symbols output by the multiple ports comprise a pulse signal output by the reference symbol port; and
the latch signal generator is further configured to generate a latch signal when detecting that the reference symbol port sends the pulse symbol.

11. The apparatus according to claim 6, wherein the temporary synchronization cycle generating unit further comprises:
a count difference obtaining module, configured to obtain a count difference between a current cycle count value of a counter of the reference symbol port and the current cycle count values of the counters of the multiple ports;
a first cycle setting module, configured to set a difference between the length of the specified pulse cycle and the count difference to the length of the temporary synchronization cycle when the count difference is smaller than one half of the length of the specified pulse cycle; and
a second cycle setting module, configured to set a difference between a sum of lengths of two specified pulse cycles and the count difference to the length of the temporary synchronization cycle when the count difference is greater than or equal to one half of the length of the specified pulse cycle.

12. The apparatus according to claim 6, further comprising:
a cycle reallocating unit, configured to reallocate the length of the specified pulse cycle to the logic circuits of the multiple ports after the logic circuits corresponding to the multiple ports and the reference symbol port of the multiple ports output the pulse signal synchronously, so that the multiple ports output pulse symbols synchronously at an interval of the specified pulse cycle.

* * * * *